(12) United States Patent
Fujinami

(10) Patent No.: US 6,694,512 B1
(45) Date of Patent: *Feb. 17, 2004

(54) DATA PROCESSING DEVICE, DATA PROCESSING METHOD AND SUPPLY MEDIUM THEREOF

(75) Inventor: Nobuhisa Fujinami, Tokyo (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/379,135

(22) Filed: Aug. 24, 1999

(30) Foreign Application Priority Data

Sep. 8, 1998 (JP) .......................................... P10-253627

(51) Int. Cl.$^7$ ................................................ G06F 9/45
(52) U.S. Cl. ...................... 717/154; 717/151; 717/152; 717/155; 717/156; 717/157; 717/158; 713/500; 713/502
(58) Field of Search ................................ 717/142, 143, 717/144, 141, 154, 155, 156, 151, 131, 132, 133, 158, 146, 152, 153, 157, 161; 713/500, 322, 502, 332

(56) References Cited

U.S. PATENT DOCUMENTS

| | | | | |
|---|---|---|---|---|
| 4,365,311 A | * | 12/1982 | Fukunaga et al. | 713/500 |
| 5,202,975 A | * | 4/1993 | Rasbold et al. | 717/151 |
| 5,287,490 A | * | 2/1994 | Sites | 717/142 |
| 5,307,478 A | * | 4/1994 | Rasbold et al. | 703/22 |
| 5,317,740 A | * | 5/1994 | Sites | 717/129 |
| 5,491,823 A | * | 2/1996 | Ruttenberg | 717/161 |
| 5,507,030 A | * | 4/1996 | Sites | 717/151 |
| 5,680,626 A | * | 10/1997 | Chu et al. | 713/322 |
| 5,889,999 A | * | 3/1999 | Breternitz, Jr. et al. | 717/158 |
| 5,894,576 A | * | 4/1999 | Bharadwaj | 717/156 |
| 5,923,883 A | * | 7/1999 | Tanaka et al. | 717/156 |
| 6,006,033 A | * | 12/1999 | Heisch | 717/158 |
| 6,026,497 A | * | 2/2000 | Myszewski | 713/502 |
| 6,058,266 A | * | 5/2000 | Megiddo et al. | 717/156 |
| 6,126,329 A | * | 10/2000 | Bennett et al. | 717/127 |
| 6,131,189 A | * | 10/2000 | Chow et al. | 717/141 |
| 6,189,141 B1 | * | 2/2001 | Benitez et al. | 717/153 |
| 6,219,833 B1 | * | 4/2001 | Solomon et al. | 717/149 |
| 6,233,678 B1 | * | 5/2001 | Bala | 712/240 |
| 6,286,132 B1 | * | 9/2001 | Tanaka et al. | 717/125 |
| 6,381,739 B1 | * | 4/2002 | Breternitz et al. | 714/37 |
| 6,456,996 B1 | * | 9/2002 | Crawford et al. | 707/1 |
| 6,539,542 B1 | * | 3/2003 | Cousins et al. | 717/151 |

OTHER PUBLICATIONS

TITLE: Optimally Profiling and Tracing Programs, author: Ball et al, ACM, 1994.*
TITLE: Introducing a CPS Style Optimizer into an Existing Compiler, author: Ferrante et al, ACM, Dec. 1996.*
TITLE: Complete Removal of Redundant Expressions, author: Bodik et al, ACM, 1998.*
Title: Eliminating branches using a superoptimizer and the GNU C Compiler, ACM sigplan, author: Granlund et al, 1992.*
Title: Placement for clock period minimization with multiple wave propagation, ACM/IEEE, author: Joy et al, 1991.*
H. Massalin, "Superoptimizer—A Look at the Small Program," Proceedings of the Second International Conference on Architectural Support for Programming Language and Operating Systems, Oct. 5, 1987, pp. 122–126.

* cited by examiner

Primary Examiner—Chameli C. Das
(74) Attorney, Agent, or Firm—Bell, Boyd & Lloyd, LLC

(57) ABSTRACT

A data processing device, data processing method and a supply medium thereof for generating machine instructions to allow faster processing. A DAG (Directed Acyclic Graph) is generated from a substitute statement input by the syntax analyzer, and instructions then generated according to the DAG in the instruction generator, and the instruction generated in the instruction execution simulator then performed and a search made by the search section for the instructions with the smallest number of clock pulses based on the number of clock pulses required to execute the instruction.

3 Claims, 6 Drawing Sheets

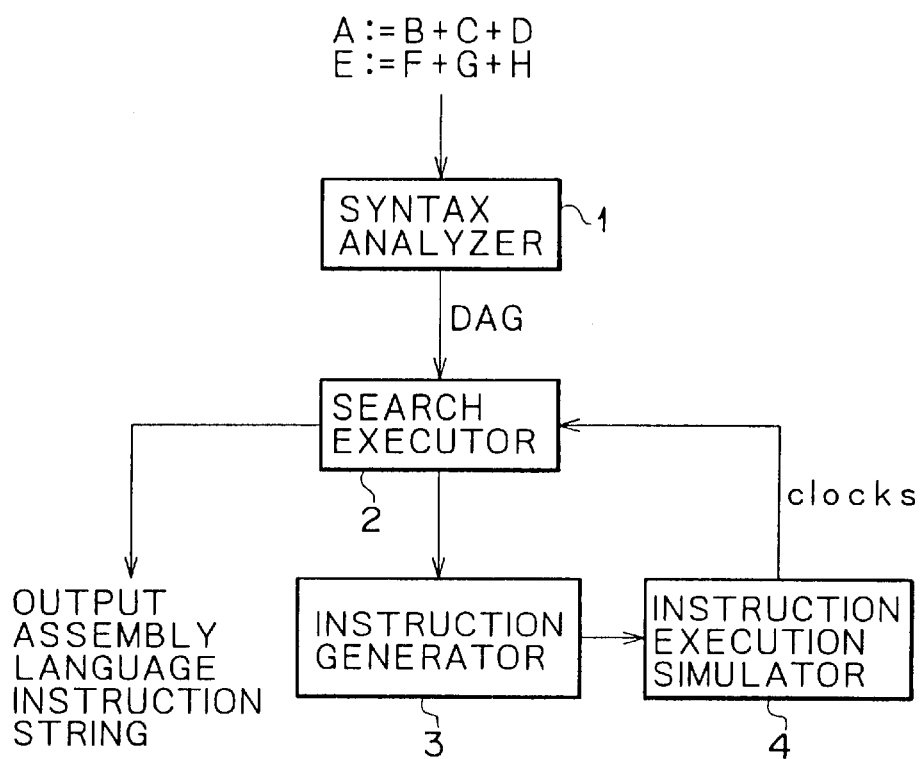
FIG.1
FIG.2
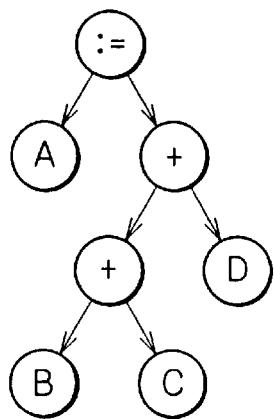
FIG.3
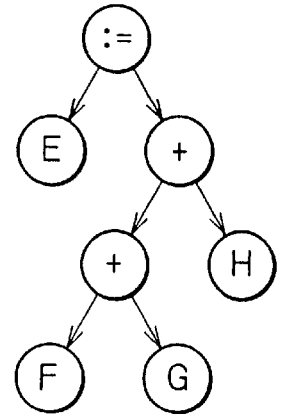

FIG. 5

| | | register clock | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|---|
| | | ST(0) | | | | | | | | | | | | | | | | | | | | |
| 1 | FLD [B] | B | □ | | | | | | | | | | | | | | | | | | | |
| 2 | FADD [C] | B+C | | □ | □ | | | | | | | | | | | | | | | | | |
| 3 | FADD [D] | B+C+D | | | □ | □ | | | | | | | | | | | | | | | | |
| 4 | FSTP [A] | — | | | | □ | | | | | | | | | | | | | | | | |
| 5 | FLD [F] | F | | | | | □ | □ | □ | | | | | | | | | | | | | |
| 6 | FADD [G] | F+G | | | | | | | | □ | □ | | | | | | | | | | | |
| 7 | FADD [H] | F+G+H | | | | | | | | | | □ | □ | □ | | | | | | | | |
| 8 | FSTP [E] | — | | | | | | | | | | | | | □ | □ | □ | □ | | | | |
| | | | | | | | | | | | | | | | | | | | | □ | □ | □ |

FIG. 6

| | | register ST(0) | ST(1) | ST(2) | clock 1 2 3 4 5 6 7 8 9 10 11 12 |
|---|---|---|---|---|---|
| 1 FLD | [B] | B | — | — | ☐ |
| 2 FADD | [C] | B+C | — | — |   ☐ ☐ ☐ |
| 3 FLD | [F] | F | B+C | — |       ☐ |
| 4 FADD | [G] | F+G | B+C | — |         ☐ ☐ ☐ |
| 5 FXCH | ST(1) | B+C | F+G | — |           ☐ |
| 6 FADD | [D] | B+C+D | F+G | — |           ☐ ☐ ☐ |
| 7 FLD | [H] | H | B+C+D | F+G |               ☐ |
| 8 FADDP | ST(2),ST | B+C+D | F+G+H | — |               ☐ ☐ ☐ |
| 9 FSTP | [A] | F+G+H | — | — |                   ☐ |
| 10 FSTP | [E] | — | — | — |                     ☐ |

FIG.7

| PROGRAM | BC5 | VC5 | Intel | SUPEROPTI-MIZATION |
|---|---|---|---|---|
| VECTOR SUM | 54/21 | 64/14 | 56/12 | 56/12 |
| INNER PRODUCT | 46/17 | 54/16 | 48/15 | 48/15 |
| OUTER PRODUCT | 96/36 | 114/27 | 104/23 | 84/22 |
| LINEAR CONVERSION | 138/51 | 168/34 | 150/33 | 128/31 |

FIG.8

```
double PX, PY, PZ, QX, QY, QZ, RX, RY, RZ;
void external()
{
  RX=PY*QZ-QY*PZ;
  RY=PZ*QX-QZ*PX;
  RZ=PX*QY-QX*PY;
}
```

FIG. 9

```
FLD      [PY]         ; 1
FLD      [QZ]         ; 2
FMUL     ST,ST(1)     ; 3-5
FLD      [QX]         ; 4
FMUL     ST(2),ST     ; 5-7
FLD      [PZ]         ; 6
FMUL     ST(1),ST     ; 7-9
FLD      [QZ]         ; 8
FMUL     [PX]         ; 9-11
FLD      [QY]         ; 10
FMUL     ST(2),ST     ; 11-13
FXCH     ST(1)        ; 11
FSUBP    ST(3),ST     ; 12-14
FMUL     [PX]         ; 13-15
FXCH     ST(1)        ; 13
FSUBP    ST(3),ST     ; 14-16
FSUBRP   ST(3),ST     ; 16-18
FSTP     [RY]         ; 17-18
FSTP     [RX]         ; 19-20
FSTP     [RZ]         ; 21-22
```

DATA PROCESSING DEVICE, DATA PROCESSING METHOD AND SUPPLY MEDIUM THEREOF

BACKGROUND OF THE INVENTION

1. Field of the Invention

The present invention relates to a data processing device, data processing method and a supply medium and relates in particular to a data processing device, data processing method and a supply medium for performing superoptimization based on the number of clock pulses.

2. Description of Related Art

Ideally, the program (machine instructions) processed by the computer are processed as quickly as possible. In view of this need, optimization is performed to reduce as much as possible, the number of instructions or the number of clock pulses.

A method also referred to as superoptimization has further been proposed to achieve optimization by receiving an input consisting of a program written in machine language and checking all possible programs in order to find a program with the same functions as the original program. This superoptimization method has been disclosed for instance in "Superoptimizer—A Look at the Smallest Program, Proceedings of the Second International Conference on Architectural Support for Programming Languages and Operating Systems, 1987, PP.122–126" by Massalin, H.

In the superoptimization method described in the above mentioned paper however, a program (machine instructions) is found having the smallest number of instructions for calculating the supplied functions based on a search of all programs. However, with the establishment in recent years of pipeline type processors, scheduling the execution of instructions on the pipeline has become essential so that the program execution time is not always shortened even if the number of instructions has been reduced.

In view of the situation, this invention has the object of creating programs capable of faster processing by utilizing the number of clock pulses to perform superoptimization.

SUMMARY OF THE INVENTION

In view of the above problems with the conventional art, this invention has the object of providing an information processing device as claimed in claim 1, comprising an analysis means to analyze the input, a generation means to generate instructions according to the results analyzed by said analysis means, an execution means to execute the instructions created by said generation means and a search means to search for an instruction having the smallest number of clock pulses required to execute the instruction with said execution means.

Another object of this invention is to provide a data processing device as claimed in claim 1, wherein said generation means generates a directed acyclic graph according to the input and performs pruning according to the number of clock pulses.

A further object of this invention is to provide a data processing device as claimed in claim 1, wherein said generation means generates a directed acyclic graph according to the input and performs pruning by means of the critical path.

A still further object of this invention is to provide a data processing method also containing an analysis step to analyze the input, a generation step to generate instructions according to the results analyzed in said analysis step, an execution step to execute the instructions generated in said generation step, and a search step to search for the instructions having the smallest number of clock pulses required to execute the instruction with said execution step.

A yet further object of this invention is to provide a data processing device as claimed in claim 2, wherein said generation step generates a directed acyclic graph according to the input and performs pruning according to the number of clock pulses.

A still further object of this invention is to provide a data processing device as claimed in claim 2, wherein said generation step generates a directed acyclic graph according to the input and performs pruning by means of the critical path.

An even further object of this invention is to provide a supply medium to provide a program capable of being loaded by a computer to run the data processing device to execute processing including an analysis step to analyze the input, a generation step to generate instructions according to the results analyzed in said analysis step, an execution step to execute the instructions generated in said generation step, and a search step to search for the instructions having the smallest number of clock pulses required to execute the instruction with said execution step.

A still further object of this invention is to provide a supply medium as claimed in claim 3, wherein said generation step generates a directed acyclic graph according to the input and performs pruning according to the number of clock pulses.

A yet further object of this invention is to provide a supply medium as claimed in claim 3, wherein said generation step generates a directed acyclic graph according to the input and performs pruning according to the critical path.

BRIEF DESCRIPTION OF THE DRAWINGS

FIG. 1 is a block diagram showing the structural layout of the superoptimizer for the data processing device of this invention.

FIG. 2 is a drawing showing the DAG (Directed Acyclic Graph).

FIG. 3 is a drawing showing the DAG (Directed Acyclic Graph).

FIG. 5 is a drawing illustrating the machine instructions generated by the typical method.

FIG. 6 is a drawing illustrating the machine instructions generated by the superoptimizer of FIG. 1.

FIG. 7 is drawing showing the relation of the number of clock pulses and number of bytes of the instruction code generated by this invention and by other methods.

FIG. 8 shows the C++ program for calculating the external sum.

FIG. 9 shows the instructions for calculating the external sum.

DETAILED DESCRIPTION OF THE PREFERRED EMBODIMENTS

Figure 4:
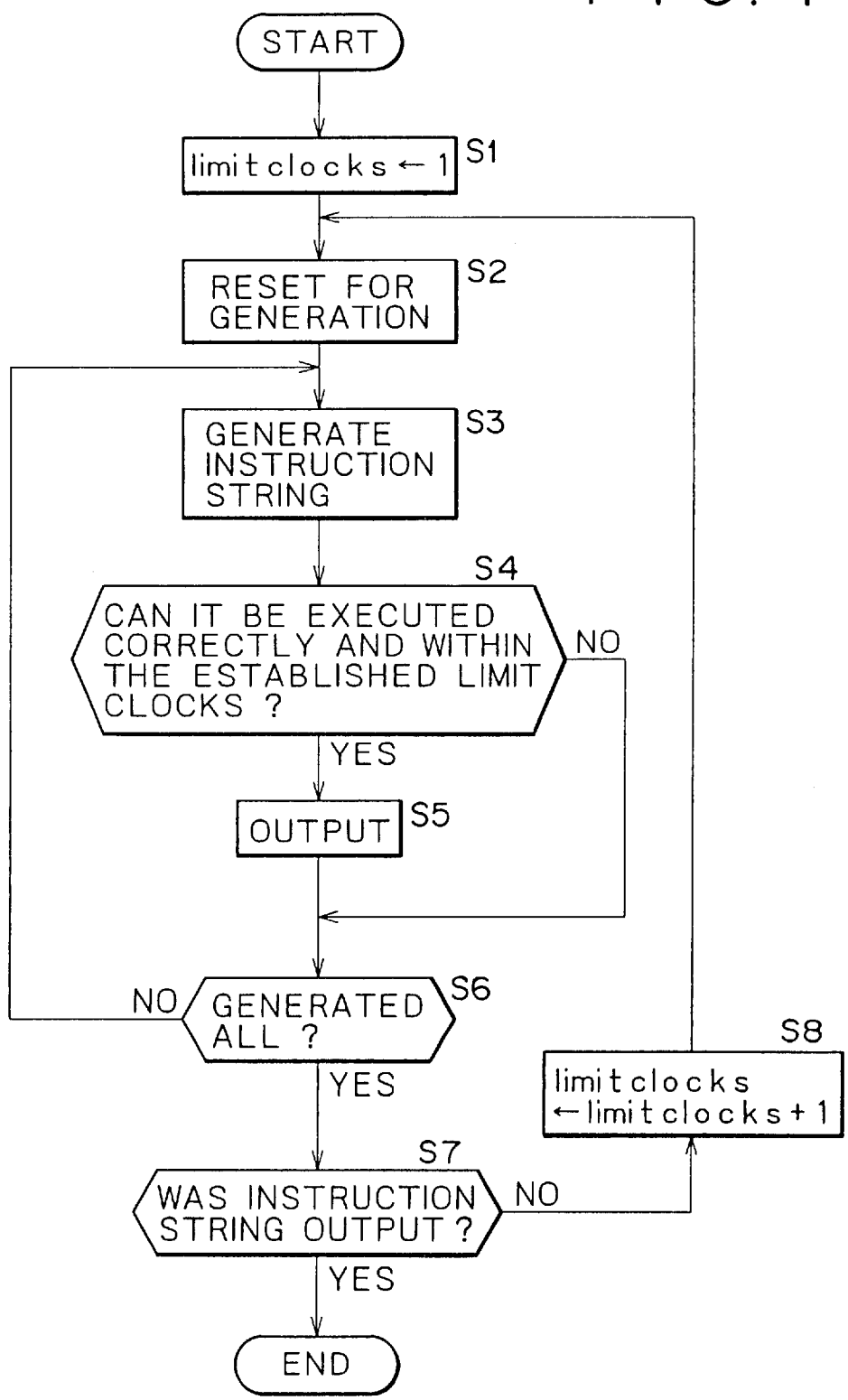
FIG. 4 is a flow chart describing the operation of the superoptimizer of FIG. 1.

The present invention will now be described while referring to the accompanying drawings.

FIG. 1 shows the functional layout of the superoptimizer of this invention. The example related in the following description utilizes the floating decimal point instruction of the Pentium (trademark) processor by Intel Corporation however this invention is also applicable to other processors. Syntax analysis of the target function specified with the command line argument is performed in a syntax analyzer 1, and a DAG (Directed Acyclic Graph) is generated to indicate the assignment statement that was input. The operators that can be used are the binomial operators +, −, *, / (of for instance, the "+"of A+B) or the monomial operator −, (of for instance the "−"of −A), ABS (absolute value), SQRT (square root), however other operators can also be added if necessary. Common expressions (such as "AxB" of AxB+AxB) are automatically detected here.

A search executor 2 makes a recursive call on an instructor generator 3 according to the DAG generated by the syntax analyzer 1 and generates instructions. The search executor 2 adds to the upper limit of clock pulses in the order of 1, 2, 3 . . . based on the clock pulses supplied by an instruction simulator 4 and performs depth-first search processing. At each recursive stage, instructions required for executing each node of DAG or instructions having no node (for instance FXCH instructions) are generated one at a time. After instructions are generated for all nodes where an instruction string is output if within the clock pulse upper limit. When a solution cannot be found, additions are made to the upper limit of the clock pulse and the search is continued.

The instruction generator 3 is called up from the search executor 2 and generates instructions needed for executing each DAG node and performing recursion. The instruction generator 3 performs no processing in cases where execution cannot be performed in cases such as when the operands are not available. Generation processing is performed in sequence when a plurality of potential instructions are present. For instance, three types of instructions (FADD ST,ST(1), FADD ST(1), (ST), FADDP ST(1)ST are present for adding a register ST(1) and a register (ST) (In these specifications, the register ST(0) is also listed as the register ST.) and are generated in sequence.

The instruction execution simulator 4 holds information such as the status of the Pentium processor (such as the pointer for the node for the value held in the register used in the processing and the end time), elapsed time and instruction string generated. The instruction execution simulator 4 also executes the instruction generated by the instruction generator 3 and updates the status by a process for readout of data from the instruction generator 3. The status is returned to the original state when the instructions are removed for backtracking such as by the guide mark trimming related later on. The instruction simulator 4 outputs to the search executor 2, the clock pulse count required for executing the instruction. The search executor 2 searches for an instruction having the smallest number of input clock pulses.

Preconditions for this superoptimizer device are as follows.

(1) A sufficient number of registers are required. In other words, memory access regarded as input/output variable access. The common expression which removes the variables themselves are not deleted until their use is no longer needed.

(2) Eliminate those elements causing redundant memory access such as variables appearing in both the input and output, and overlapping (redundant) output variables, etc.

(3) Do not allow any problems such as cache mistakes or misalignment errors to occur during the execution period.

(4) Do not use algebraic conversions of equivalent values such as with the associative law or distributive law since this may cause problems in the floating decimal point.

Next, the operation of the superoptimizer device of this embodiment is described. The syntax analyzer 1 performs a syntactic analysis of the assignment statement, creates a DAG and outputs the DAG to the search executor 2. For instance, when the assignment statements $A:=B+C+D$ $E:=F+G+H$ are input, a DAG is generated for each of these lines as shown in FIG. 2 and FIG. 3. The "O" mark in FIG. 2 and FIG. 3 indicates a node.

Based on the DAG generated in this way, the search executor 2, the instruction generator 3 and the instruction execution simulator 4 perform the processing as shown for instance in the flowchart of FIG. 4.

In other words, in step S1 first of all, the search executor 2 sets the variable indicating the clock upper limit to an initial setting of 1 and in step S2, the instruction generator 3 performs the initial processing for generating the instruction.

Next, instep S3, the instruction generator 3 makes an instruction string. This instruction string that was made, is supplied in step S4 to the instruction execution simulator 4 and simulated. Further, the instruction execution simulator 4 determines whether or not the instruction that was input is correct and if that instruction can be executed with a clock pulse within the upper limit set in step S1 on the limit clocks. If a NO is determined in step S4, then the process shifts to step S6 and the search executor 2 decides whether or not all instructions were generated within the upper limit of the limit clocks. When not all the instructions were generated then the process returns to step S3 and all subsequent processing is repetitively performed.

In step S6, when determined that the clock pulse count for all instructions is within the upper limit of the limit clocks, the process proceeds to step S7 and the search executor 2 determines whether or not the instruction string was previously output in step S5. When the instruction string still has not been output, the process proceeds to step S8, where the search executor 2 increments the limit clock upper limit by 1 and then the process returns to step S2. Then, all processing subsequent to step S2 is repetitively performed.

On the other hand, in step S4, when determined that the instruction string that was generated is correct and further that the clock pulses are within the upper limit of the limit clocks, then the process proceeds to step S5 and the search executor 2 outputs that instruction string as an assembly language instruction string. When this instruction string is output, the output of the instruction string in the processing step in step S7 is determined to have occurred and the processing ends.

Hereafter, the case of a superoptimized program for calculating, $A:=B+C+D$ $E:=F+G+H$ is explained (a program for calculating B+C+D, substituting the result into A, and calculating F+G+H and substituting the result into E.). However, before the superoptimizing explanation, the case of a substitute sentence translated into the assembly language for an Intel Pentium processor unchanged without performing superoptimization is first explained while referring to FIG. 5.

When the above two substitute sentences are translated unchanged, the results appear as shown in FIG. 5. In the instruction "FLD [B]" in the first line of FIG. 5, the value for the memory B is loaded into a register ST(0). This processing is executed by the first clock cycle.

Next, the value for the memory C is added to the value of the register ST(0) by the second instruction "FADD [C]". This processing holds B+C in the register ST(0). This arithmetic is performed by the second through fourth clock cycles (3 clock pulses are needed to perform addition).

Next, when the third instruction "FADD [D]" is executed, the memory D value is added to the current values up until then for B+C of the register ST(0) and becomes B+C+D. This arithmetic is executed by the fifth through seventh clock cycles.

The value B+C+C stored in the register ST(0) is next loaded into the memory A by means of the fourth instruction "FSTP [A]". This FSTP instruction requires a value be loaded 1 clock prior to starting the instruction so after stalling by an amount equal to the eighth clock, the "FSTP [A] instruction is executed in the ninth and tenth clock cycles.

The above processing completes the execution of A:=B+C+D.

Hereafter, the processing for E:=F+G+H is executed just as was related above by means of the fifth through eight line instructions.

FIG. 6 shows an example of superoptimizing by means of the superoptimizing device of FIG. 1. In this example, the value for the memory B is loaded into the register ST(0) for the first instruction string "FLD [B]". This instruction is executed with the first clock cycle. The second instruction "FADD [C] is an instruction to add the value stored in memory C into the register ST(0). The above steps function to store B+C in the register ST(0). This addition is executed at the second through fourth clock cycles after completion of the first instruction.

The third line instruction "FLD [F]" is an instruction to load the value of the memory F into the register ST(0). At this time, the values B+C stored in the register ST(0) up to this time are shifted to a later stage of a register ST(1). In the Pentium (commercial trademark) processor, the calculations are placed in a pipeline format and the instructions FADD, FSUB, FMUL at their start at the next clock cycle, can start the next successive command (However, starts after 2 clock cycles when linked by FMUL.) Therefore, after starting the second line instruction "FADD [C]" at the second clock cycle, the third line instruction "FADD [F]" executes at the next third clock cycle.

The fourth line instruction "FADD [G]" is an instruction to add the value stored in a memory G into the register ST(0). In this case, the value F has already been stored in the register ST(0) so a new value G is added to form F+G. This fourth line instruction is executed in the three clock cycles from the fourth through sixth clock cycles.

The fifth line instruction "FXCH ST(1)" is for exchanging the contents of the register ST(0) and the register ST(1). In this case, the values B+C held in the register ST(1) up to that time are moved to the register ST(0), and the values F+G held up to that time in the register ST(1) are moved to the register ST(0). This instruction FXCH is capable of being executed even if the value is in the process of being calculated. Furthermore, under certain conditions, the execution of FXCH can start simultaneous with the previous instruction. The fifth line instruction is started at the fourth clock, at the same timing as the fourth line instruction "FADD [G]".

Next, the value D is added to the value B+C held in the register ST(0) by means of the sixth line instruction "FADD [D]". After completion of the fifth line instruction, this "FADD [D]" instruction is executed in the fifth through seventh clock cycles.

The seventh line instruction "FLD [H]" loads the value of the memory H into the register ST(0) and the values B+C+D held in the register ST(0) up to that time are shifted to the latter stage of the register ST(1), and the value F+G held up to that time in the register ST(1) is shifted to the latter stage of the register ST(2). The instruction FLD is executed in the sixth clock cycle after the fifth clock cycle has started the immediately prior sixth line instruction FADD.

The eighth instruction string "FADDP ST(2),ST" adds the value H held in the register ST (register ST(0)) to the value F+G held in the register ST(2) and further, deletes the value H held up to that time in the register ST(0). At that time, the eighth instruction string also transfers the value B+C+D held in the register ST(1) to the prestage of the register ST(0) and the value F+G+H held in the register ST(2) are at that time transferred to the prestage of the register ST(1). The instruction string "FADDP ST(2),ST" is executed in the seventh through ninth clock cycles following the sixth clock cycle for executing the immediately prior seventh instruction string.

The ninth line instruction "FSTP [A]" is an instruction for storing in the memory A, the value B+C+D held up until that time in the register ST(0). This instruction "FSTP [A]" transfers into the prestage register ST(0), the values F+G+H held up until that time in the poststage register St(1). Up until one clock prior to starting, the instruction FSTP requires a value to load. In this case, the value B+C+D for loading, is obtained at the seventh clock timing at which the sixth instruction "FADD [D]" was executed. Whereupon, the ninth line instruction awaits one clock period which is the end of the eighth clock cycle and is executed in the ninth and tenth clock cycles.

Next, in the tenth line instruction "FSTP [E]", the value F+G+H held in the register ST(0) is store in the memory E. As a result, nothing is stored in the register ST(0). The instruction FSTP appears consecutively in the ninth and tenth line instructions however these FSTP instructions cannot be processed in parallel. Accordingly, the instruction is executed at the eleventh and twelfth clock cycles, after processing of the immediately prior ninth line instruction FSTP is complete.

The sample instruction of FIG. 5 is comprised of eight lines but the number of clocks required for processing is 20. The sample instruction of FIG. 6 however has ten lines but the number of clocks is 12. Accordingly, compared to the instruction sample in FIG. 5, the sample instruction of FIG. 6 can obtain the same calculation results with greater speed.

In this invention, since superoptimizing can be performed by executing the instructions in parallel and arranging the instructions awaiting one clock in the optimal order, a program can be created that is capable of being processed with a fewer number of clocks.

The instruction generator 3 creates instruction in each step S3 and eliminates instructions determined beforehand to be useless (called pruning) so that superoptimizing can be performed even faster. Each DAG node besides pointers for guide mark trimming such as operator names, variable names and subnodes also calculates and holds data for reference counts, executed flags, and the critical path count.

The reference count is a figure indicating nodes that have still not been executed from among those nodes (nodes set as subnodes) requiring the value in the node holding the target reference count. An executed flag is a flag indicating whether or not the figure showing the value of the node holding the target-executed flag has been calculated. The critical path count is a figure indicating the number of clocks required until calculations dependent on the target execution results are complete when an instruction has been executed for a node holding the target critical path count. When a plurality of paths are present, the maximum value is selected.

Pruning processing consists of pruning by reference count value, pruning by the clock count, pruning by the critical path as well as pruning by the code size.

When an instruction string has been added to the instruction in pruning by reference count value, the following instructions must not be used.

(1) Instructions that delete all values of a register having values showing nodes whose reference count is not zero (0).

(2) Instructions to load in a register, variable values whose reference count is zero (0).

In pruning by clock count, after adding an instruction, the minimum time required for executing an as yet unexecuted node is totaled and if the clock pulses for instructions created up to now and that sum exceeds the upper limit, then that instruction cannot be used (sets backtracking). For instance if one instruction is added and two substitute sentences remain, then 1×1+2×2=5 so a minimum of five clock cycles are required. If the current number of clock cycles exceeds the upper limit when 5 is added, then that instruction cannot be used.

In pruning by critical path, after adding an instruction, the maximum value of the critical path clock count is found from among the as yet unexecuted modes and if the total sum together with the clock of the instructions made up to now exceeds the upper limit, then that instruction is set so it cannot be used. When for instance, the addition results are substituted in unchanged, a 2 is stored for the FSTP instruction execution time, an FSTP instruction time 1 is stored in the addition node, and an execution time 6 (added by 3) is then stored. Then, before starting the search, the maximum value stored in the values for the as yet unexecuted nodes is found and if the total after summing with the clock count for instructions made up until now exceeds the upper limit, then backtracking is set.

In pruning by code size, after adding an instruction, the minimum instruction byte count necessary for executing an as yet unexecuted node are totaled and if the sum including the byte count for the instructions made up until now exceeds the previously found byte counts, then that instruction is set so it cannot be used. Pruning by code size is an effective method for output of the smallest (small byte count) possible instruction string from among the instruction strings with the same byte count.

FIG. 7 shows results obtained as a result of experiments with the method of this invention and other methods per vector sums, inner products, outer products and linear conversions often used in 3-dimensional models.

The values listed under the superoptimizing item in FIG. 7 are based on the method of this invention. The BC5, VC5 and Intel respectively use the following compilers and compiling options.

BC5: Borland C++5.0J(BCC32-5-02-S)
VC5: Visual C++5.0(CL/G5/02/Fa)
Intel: Intel (trademark) compiler (BCC32I-5-02-S) for Borland C++5.0J The values shown in FIG. 7 are the clock count and byte count for the generated code. Though the byte count may at times increase somewhat in the method of this invention, this method is clearly capable of generating instruction strings with the smallest number of clocks.

Of the calculations in FIG. 7, a C++ program as shown in FIG. 8 is used for instance to calculate the outer product. The case when the instruction string of this outer product is superoptimized by the method of this invention is shown in FIG. 9. As can be seen, a total of 22 clocks were required to perform the outer product calculation.

Thus, as described above for the method of this invention, instruction strings capable of being executed within the clock count upper limit can all be generated regardless of the number of instructions. Instructions are added one at a time starting from an empty instruction string and potential instruction strings generated. When the clock count exceeds the upper limit before the target function can be calculated, then that instruction string is deleted from the potential instruction strings. In fact, some potential instruction strings that were made, are eliminated by pruning prior to reaching the upper limit of clock pulses.

Operation simulations are being performed in order to obtain the number of clocks for the above description, however the time is dependent on the clock pulses so that even if the instruction is actually used and the time measured, the results will be the same as described above.

In these specifications, the system is shown as an overall device comprised of a plurality of devices.

The supply medium for providing the computer program for performing the above related processing, besides consisting of a recording medium such as a CD-ROM or solid memory may also consist of a communications medium such as a network or a satellite.

This invention as described above is therefore capable of generating machine instructions with the smallest number of clock pulses and thereby create faster processing instructions.

What is claimed is:

1. A data processing device comprising:
an analyzer to analyze an assignment input;
a generator to generate a directed acyclic graph according to a result of the analyzer;
an executor to execute the directed acyclic graph created by the generator;
a searcher to recursively search for an instruction having a smallest number of clock pulses required to execute the directed acyclic graph with the executor based on a clock pulse count supplied by the executor; and
pruning means for prohibiting generation of an instruction unnecessary for executing the directed acyclic graph based at least on one of a reference count value, a clock count, a critical path and a code size.

2. A data processing method comprising the steps of:
analyzing an assignment input;
generating a directed acyclic graph according to a result of the analysis step;
executing the directed acyclic graph generated in the generation step;
recursively searching for instructions having a smallest number of clock pulses required to execute the directed acyclic graph with the execution step based on a clock pulse count supplied by the executing step; and
prohibiting generation of an instruction unnecessary for executing the directed acyclic graph based at least on one of a reference count value, a clock count, a critical path and a code size.

3. A supply medium to provide a program capable of being loaded by a computer to run a data processing device to execute processing including the steps of:

analyzing an assignment input;

generating a directed acyclic graph according to a result of the analysis step;

executing the directed acyclic graph generated in the generation step;

recursively searching for instructions having a smallest number of clock pulses required to execute the directed acyclic graph with the execution step based on a clock pulse count supplied by the executing step; and prohibiting generation of an instruction unnecessary for executing the directed acyclic graph based at least on one of a reference count value, a clock count, a critical path and a code size.

* * * * *